United States Patent [19]

Howard

[11] Patent Number: 4,526,800

[45] Date of Patent: Jul. 2, 1985

[54] CEREAL SNACKFOODS AND COMPOSITIONS AND METHODS FOR MAKING THE SAME

[76] Inventor: Alan N. Howard, 39 Gilmerton Crt., Long Rd., Trumpington, Cambridge CB2 2HQ, England

[21] Appl. No.: 600,559

[22] Filed: Apr. 17, 1984

Related U.S. Application Data

[63] Continuation-in-part of Ser. No. 257,320, Apr. 24, 1981, abandoned.

[30] Foreign Application Priority Data

Apr. 26, 1980 [GB] United Kingdom ................ 8013858

[51] Int. Cl.³ ............................................. A23L 1/10
[52] U.S. Cl. .................................... 426/559; 426/448; 426/440; 426/621; 426/625; 426/661; 426/808
[58] Field of Search .............. 426/448, 440, 550, 559, 426/618-621, 625, 661, 808

[56] References Cited

U.S. PATENT DOCUMENTS

| | | | |
|---|---|---|---|
| 2,701,200 | 2/1955 | Huber | 426/559 |
| 3,656,966 | 4/1972 | Ball | 426/440 |
| 3,922,370 | 11/1975 | Prakash | 426/440 |
| 3,989,858 | 11/1976 | Williams | 426/440 |
| 4,350,714 | 9/1982 | Duvall | 426/621 |

FOREIGN PATENT DOCUMENTS

| | | | |
|---|---|---|---|
| 2446872 | 4/1976 | Fed. Rep. of Germany | 426/618 |
| 1385130 | 2/1975 | United Kingdom | 426/618 |

*Primary Examiner*—Jeanette M. Hunter
*Attorney, Agent, or Firm*—Alexis Barron

[57] ABSTRACT

The invention provides cereal snackfoods of the expanded variety such as crisps and the like. The snackfoods of the invention comprise discrete cooked portions of a dough composition comprising gelatinized starch and added cereal bran other than rice bran, in which the amylolytic activity of the bran is controlled, and contain at least about 5% by weight and generally no more than about 35% by weight of oil or fat. The snackfoods may be produced from a half product comprising at least some gelatinized starch and added cereal bran by frying or by immersion in a bed of hot particulate material followed by spraying with fat or oil. Even when fried the snackfoods have a lower energy value than comparable known products; moreover they are highly palatable, and the bran content provides a useful source of fibre in any diet.

10 Claims, No Drawings

CEREAL SNACKFOODS AND COMPOSITIONS AND METHODS FOR MAKING THE SAME

This is a continuation-in-part of application Ser. No. 257,320 filed Apr. 24, 1981, now abandoned.

BACKGROUND OF THE INVENTION (a) Field of the Invention

The present invention relates to expanded snackfoods such as crisps and like foods obtained by cooking discrete portions of a dough composition.

(b) Description of the Prior Art

An essential requirement to obtain such expanded snackfoods is that before cooking at least some of the starch in the dough should be gelatinized. Gelatinization of the starch is typically achieved by cooking it in the wet state, whence a physical change takes place in its structure such that it becomes more viscous. It is believed the presence of gelatinized starch is necessary to trap the steam produced on cooking so as to give the necessary expanded structure.

Various processes for preparing expanded snackfood products have been described by Willard, Snack Foods, 62, pages 52 to 54, 1973, (see also U.S. Pat. No. 3,997,684) and Matz, Snack Food Technology, The AVI. Publishing Company, Inc., Westport, Conn., U.S.A., pages 144 to 149.

The processes using dough can generally be grouped into three categories and summarised as follows:

(1) The dry collett process:

In this process a thin portion of dried starch-based gel is expanded by a short immersion in hot fat or, as described in British Patent Specification No. 2,008,924 A, by cooking in a hot bed of, for example, salt or calcium carbonate.

Typical of such a process is that disclosed in British Patent Specification No. 888,689 which describes the manufacture of a potato-based foodstuff in which potato flour is mixed with powdered potato starch, water is added to form a dough, and the dough is cooked so as to gelatinize the starch, the swollen dough being dried to form a product having a rubber-like consistency. After drying, the dough can be sliced, the slices further dried, and then cooked in boiling fat to provide potato crisps.

In another such process described in U.S. Pat. No. 4,140,803 starch is gelatinized by feeding an aqueous slurry containing starch onto a hot double roller dryer, and the multilaminar film obtained is cut into small pieces and fat fried.

In other such processes as described in, for example, British Patent Specification Nos. 1,358,097 and 1,484,455, a dough containing some pre-gelatinized starch is extruded through a die under conditions of temperature and pressure which lead to further gelatinization; the small pieces of this dried material are then fried as before.

(2) Frying a wet completely gelatinized dough:

In this process a wet dough containing about 30 to about 85% solids is cut into desired shapes, and then fried, the starch in the dough being completely gelatinized before it is fried. Some of the products made in this category are described in U.S. Pat. Nos. 3,539,356; 3,297,450; 3,451,822; and 4,007,292; and Canadian Patent Specification No. 871,648.

(3) Frying a wet dough containing some ungelatinized starch:

In this process the dough contains a mixture of gelatinized and ungelatinized starch, and consists of from about 30 to about 70%, usually from about 40 to about 50%, by weight of solids. The dough is formed into pieces and fried. With such a dough, for example, as described in U.S. Pat. No. 3,997,684, the expansion is only about 1.6 times the original volume compared with the over three times expansion obtained by the processes of the two previous categories.

In the production of baked or toasted cereal products of the kind used as breakfast foods, and in the production of biscuits and cookies, it is known to employ a dough mixture including bran in various proportions of up to about 100% of the product. Examples of such foods are disclosed in British Patent Specification Nos. 344,055, 1,561,190 and 2,010,656 A.

In addition, British Patent Specification Nos. 1,465,843 and 1,544,843 disclose snackfoods including rice bran material, particularly in the latter case to afford a rice cracker flavour.

Furthermore, U.S. Pat. No. 2,701,200 to Huber, is concerned with a novel puffed product which may contain bran and with a process of producing that product. In the Huber process heated pressure rollers are employed to solve problems encountered in the prior art both with puffing guns and "radiant" puffing, the product produced mainly being a breakfast cereal-type product which is fat- or oil-free. While the earlier disclosure mentions that in place of whole grain materials one may use selected fractions of grains and, as examples of such fractions, selected flours, meals, farina, bran and the like—and indeed while, in its Example 10, the earlier disclosure employs wheat bran and oat bran along with white corn cones and yellow corn cones to give a dry-mix bran content of about 18% by weight—there is no expressed or implied appreciation of the use of added cereal bran in a snackfood product. The presence of bran is incidental to the problem solved by the earlier invention in the provision of heated pressure rollers to achieve a puffed product.

Also, U.S. Pat. No. 3,656,966 to Ball et al, which relates to a process for making a ready-to-eat food chip from cereal grain, includes products prepared by the disclosed process having their own natural bran, that is non-added bran at a level of up to no more than about 9% by weight. It is furthermore disclosed that in the resulting dough the wheat particles of the wheat or rye bran are retained after cooking and it is said that the oil content of the final product may range from about 25% to about 40% and preferably is about 30%. Again, however, the earlier invention is concerned with the use of a cutting operation to reduce the size of individual grain kernels to increase their total surface area and to expose the endosperm, thereby improving the absorption of moisture capabilities of the kernals when combined with water, and not specifically with the provision of a bran-containing food. The presence of bran is again incidental to the problem solved.

Thus, in the prior art, bran-containing products can be seen to fall into one of the following categories, namely:

1. Specialised products with a distinctive flavour e.g. with added rice bran to impart that flavour,
2. Fat-free products e.g. breakfast cereal products, and
3. Products including their own natural bran with relatively high oil or fat contents.

Furthermore, it might be thought that to add bran to an expanded snackfood product as opposed say to a breakfast-food product would detract from the degree of expansion or lead to no expansion at all. Also, it might be thought that to add bran would lead to unacceptably high levels of fat or oil, where fat or oil cooking is employed to expand the snackfood dough.

However, I have now found surprisingly that a snackfood can be produced successfully from a dough mix of predetermined volume comprising gelatinized starch and added bran, the snackfood being both expanded to at least about 1.25 said predetermined volume and of relatively low fat content, provided the amylolytic activity of the bran is controlled to prevent breakdown of gelatinized starch in the dough composition subsequent to the formation of the dough composition to be cooked and up to cooking of the dough.

SUMMARY OF THE INVENTION

Accordingly, the present invention provides an expanded snackfood prepared from a dough composition of predetermined volume and comprising cooked portions of dough composition comprising gelatinized starch and added cereal bran selected from the group consisting of wheat bran, barley bran, oat bran, rye bran, maize bran and mixtures thereof, the snackfood containing from about 5% to about 35% by weight of oil or fat and from about 10% to about 70% by weight of bran, and having a volume at least about 1.25 times said predetermined volume, the amylolytic activity of the bran being controlled to minimise breakdown of gelatinised starch in the dough composition subsequent to the formation of the dough composition to be cooked and up to cooking of the dough.

DESCRIPTION OF THE INVENTION

The expanded snackfood of the present invention is intended to be a crisps-like product. That is to say it should have a "fried" flavour imparted to it by the presence of at least about 5% by weight of saturated or unsaturated oil or fat, whether incorporated by frying or otherwise, e.g. by spraying onto the cooked product. In addition, the bran employed must not in itself nor in the amount in which it is employed impart to the snackfood organoleptic properties which significantly detract from a crisps-like feel and/or flavour. Thus, the bran used should not be rice bran which has a distinctive character and flavour sufficient to detract from the properties required, and it is to be understood that the term "cereal bran" as used herein and in the claims does not include rice bran.

Moreover, the snackfood must be expanded, that is the dough portions from which it is derived must be expanded by frying or other cooking processes generally to at least about 1.25 times their original volume, preferably to at least about 1.5 or about 1.6 times, more preferably to at least about 2 times, e.g. about 2.5 or about 3 times their original volume. Surprisingly, the incorporation of bran does not lead (as was expected) to a crisps-like snackfood in which the expansion is kept to an undesirably low level. Thus, with a product containing 50% by weight of bran the mean expansion may be, for example, about 1.5 times.

The present snackfood is highly palatable and can contain a high content of bran, generally a content higher than that present in whole wheat flour (about 9% by weight of bran), and always a content higher than the natural content of whatever starch source is employed. Generally, therefore, the snackfood of the invention comprises at least about 10% by weight of bran, for example, from about 15 to about 70% by weight of bran, and preferably from about 20 to about 50% by weight of bran. The inclusion of bran in a snackfood provides a highly palatable means of including fibre in a diet, the necessary level of fibre often lacking in the diets of Western populations.

It is a particularly surprising feature of the present snackfood that it has a high palatability, both from the point of view of taste and of texture. The snackfood while still being a crisps-like product differs from conventional potato crisps in being harder to bite, and thus affords a "crunchy" feel, which provides much more oral satisfaction. Moreover, while many bran products are disliked because of a heavy bran flavour, surprisingly the inclusion of bran in the present snackfood gives a more pleasant "proteinaceous" flavour than in other bran-containing products.

The snackfood of the invention may be in any of the many usual discrete portion forms. Thus, for example, it may be in the form of thin wafers such as crisps, or in the form of rings, straws, chips, small "sausages", cones and the like.

The gelatinized starch may be used alone or in admixture with ungelatinized starch and may be incorporated in the dough in any convenient form. Thus, at least some of the starch may be pre-gelatinized or at least some of the starch may be gelatinized by cooking once the dough composition has been prepared. By way of example, the starch may be one obtained from wheat, oats, barley, rye, maize, rice, cassava, potatoes, tapioca, sago, legumes and arrowroot. Preferably, the starch is one provided by incorporating a cereal flour, in particular wheat flour, in the dough. In an especially preferred aspect the wheat flour is one in which the starch has been pre-gelatinized, e.g. one made by taking white wheat flour, making it into a slurry with water, and then spraying the mixture onto hot rollers. The dried material is scraped off and remilled to give a fine powder which can later be reconstituted with water into a dough. A similar technique can be applied to flours from sources other than wheat to afford the necessary pre-gelatinized material.

In another preferred aspect, the gelatinized starch is provided by dehydrated cooked potateos.

Preferably the cereal bran used in the present invention is wheat bran. However, other forms of cereal bran may be used where these are available and can produce the desired fibre content, for example, barley, oats, rye or maize bran.

Commercially available bran is the residue left over from the milling of grain to produce flour, and comprises the grain husk with varying but relatively small amounts of adhering endosperm. Thus, wheat bran is available as course bran, middlings (or weatings) and superfine weatings which respectively comprise up to about 10% by weight, up to about 5.8% by weight and up to about 4.5% by weight of crude fibre. Since the amount of crude fibre in commercially available bran can vary it is to be understood that the term cereal bran as used herein and in the claims means a bran material including not less than about 4.0% by weight of crude fibre, crude fibre being the residue left after extraction with petroleum ether and then (a) boiling with about 1.25% sulphuric acid and (b) boiling with about 1.25% caustic soda, minus ash. Preferably, the bran used in the present invention is one comprising at least about 4.5% by weight of crude fibre.

It will be understood by those familiar with dietary nomenclature that the terms "dietary fibre" and "crude fibre", although related, are not equivalent. Generally speaking, for any one product, the latter is lower than the former by a factor of about 5. Thus, by way of example, typical analyses for coarse wheat bran and middlings may be as follows:

TABLE I

|  | Coarse Bran | Middlings Bran |
| --- | --- | --- |
| % Fat | 2.75 | 3.45 |
| % Protein | 13.55 | 13.45 |
| % Starch | 9.2 | 38.9 |
| % Sugars | 8.6 | 7.55 |
| % Dietary Fibre | 58.5 | 32.5 |
| % Crude Fibre | 10.0 | 5.6 |
| Calorific Value Kcals/100 g | 149 | 271 |

It will be appreciated from the above discussion that wheat bran on average can provide a content of say about 45% by weight of dietary fibre, although the content of crude fibre provided is much less. In any event, however, a snackfood containing about 15% by weight or more of wheat bran in accordance with the invention will contain a significant and useful amount of dietary fibre.

In putting the present invention into practice it is essential that the dough composition which is finally cooked to produce the snackfood should include at least some gelatinized starch. The presence of such starch is essential to the formation of an expanded structure, and preferably the dough should contain at least about 25% by weight of gelatinized starch based on the total weight of starch, for example, from about 30% to about 70% by weight or higher. Most preferably, however, the dough may contain up to about 100% by weight of gelatinized starch based on the total weight of starch.

Furthermore, since high amylolytic activity introduced into the dough through the added bran can greatly reduce the content of gelatinized starch, that activity must be controlled. In particular, such control must be exercised at least subsequent to the formation of a dough including both the desired final amount of gelatinized starch and added bran, and before final cooking to expand the dough to the desired snackfood.

It is important to control the effect of amylolytic activity on the content of gelatinized starch during the process of making the "half-product" from which the present snackfood is prepared because excessive breakdown of gelatinized starch (once the dough to be cooked has been prepared) can lead to a product which expands poorly, or not at all, on cooking. Furthermore, such control is also important because once a mixture of a bran with high amylolytic activity together with gelatinized starch and water is formed, and if no control is exercised, the strength and elasticity of the dough become impaired. It then becomes difficult, or impossible, to extrude the dough in a continuous manufacturing process.

In processes which employ ungelatinized starch to give an initial mixture of bran, starch and water, prior to the making of the final dough composition, it is not necessary initially to treat the bran, since the amylolytic enzymes in raw bran attack ungelatinized starch only slowly. However, once gelatinized starch is present, it is important to control the amylolytic activity of the mixture to prevent breakdown of gelatinized starch either on further processing and/or on storage.

Such control of the amylolytic activity is as required in the preparation of the present snackfood, can be exercised in a number of ways. In one aspect of the invention the bran can be treated externally of the dough, i.e. pre-treated, to reduce its amylolytic activity to below a level at which it appreciably decreases the gelatinized starch content of the dough. Alternatively, in another aspect of the invention, the bran can be treated internally of the dough to reduce its amylolytic activity to below a level at which it is detrimental to any gelatinized starch present.

Thus, for example, the amylolytic activity of the bran within the dough can be controlled by mixing the dough under refrigerated conditions, generally wherein the temperature of the dough composition is held at no more than about 10° C. prior to cooking. In that manner digestion of gelatinized starch by amylase present in the bran can be kept to a minimum, and the structure of the final snackfood can be maintained.

Preferably, however, the bran is treated to reduce its amylolytic enzyme, e.g. amylase, content (and consequently its amylolytic activity) so as to avoid the necessity to employ refrigeration prior to cooking. In that case it is preferred that any treatment of the bran, whether before or after addition to the dough, should reduce its amylolytic enzyme content to a level where the bran has a maltose value of not more than about 350 mg/10 g. More preferably, however, the bran is one having a maltose value reduced to not more than about 250 mg/10 g, e.g. about 200 mg/10 g or below, and most preferably not more than about 100 mg/10 g.

The treatment of the bran to reduce its maltose value may be effected by any convenient technique. Preferably, however, the amylolytic enzyme conent of the bran is reduced by a heat treatment. A heat treatment will destroy enzymes such as amylase and may under certain circumstances gelatinize residual starch in the bran.

Thus, in one process, the amylolytic activity of the bran may be controlled by heating the bran before it is added to the dough composition. For example, natural or raw bran may be treated by one of the following techniques, namely:

(i) By autoclaving at about 120° C. for about 20 minutes.

(ii) By extruding the bran in a heated extruder which heats the bran to about 160° C. for about 10 seconds.

(iii) By mixing the bran with water to form a slurry, which is then extruded onto a roller dryer operated at about 100° C., followed by milling of the dried product to a fine powder.

Alternatively, in another process, whole wheat grain is heated by live steam at about 100° C. for about 20 minutes. The thus-produced grain on subsequent milling gives a bran with reduced amylolytic activity.

Additionally or alternatively, the heat treatment of the bran may be effected after it is added to the dough composition, but before the dough includes its finally required content of gelatinized starch. In that case, there is preferably first formed a dough composition comprising raw bran and ungelatinized starch, and the dough composition is heated both to reduce the amylolytic enzyme content of the bran and to gelatinize at least some of the starch in the dough.

A particularly unexpected property imparted to the snackfood of the present invention by the incorporation of added cereal bran is the ability to have a relatively low fat content compared with known crisps or the like, even when frying is used for cooking. One drawback of potato crisps and other fried snackfoods is their high caloric value, and it is a significant advantage of the present snackfood that its caloric value can be much less per unit weight than other such foods not containing bran.

Thus, the present snackfood is advantageous in that it provides a good source of fibre in any diet, it is highly palatable, it has a fried flavour, and yet since it can contain fewer calories than comparable known products not containing bran, it can be produced in a form acceptable to those on weight loss diets.

Subject to what is said above, the expanded snackfood of the present invention may be prepared by any process which comprises mixing starch, e.g. wheat flour, and bran, and treating the mixture by any technique which affords the necessary instantaneous, severe, localised heating conditions to provide discrete cooked portions of said dough expanded to the necessary level. For example, the snackfood may be prepared by any of the processing techniques in categories (1) to (3) described above.

Thus, for example, such a process may comprise adding water to a mixture of bran and ungelatinized starch or a source thereof to form a dough, heating the dough to gelatinize at least some of the starch (and to treat the bran), sub-dividing the resulting dough composition, e.g. by slicing, and drying the subdivided dough to form discrete portions of a "half product" which can be cooked either by frying in fat or oil or, for example, by immersion in heated salt or calcium carbonate. The "half product" can also be made by mixing pre-heated bran with pre-gelatinized starch and water to form a dough which is cut or otherwise subdivided and then dried, or by forming a slurry of bran and ungelatinized starch or a source thereof, which is then hot roller dried, and the thus-formed sheet of dried dough subdivided e.g. cut, into discrete portions. Such cut portions may be cooked as such or ground, and reconstituted with water to make a dough, which itself is cut or otherwise sub-divided and dried.

As another example, the process of the invention may comprise forming a dough comprising either pre-treated and/or raw bran and starch, some of which is gelatinized, extruding the dough through a die under conditions of temperature and pressure which lead to gelatinization of more of the starch (and treatment of the bran, if raw bran is used), sub-dividing the extruded dough into discrete portions, and cooking the portions.

Preferably the snackfood of the invention is prepared by a process using pre-gelatinized starch suitably in the form of a gelatinized wheat flour or potato flour.

An advantage of employing pre-gelatinized starch is that flavouring and other materials can be incorporated in the dough and there is much less likelihood of these materials being destroyed than might be the case when the dough is cooked to provide gelatinization.

In order to achieve the necessary expansion, it is desirable that the half product prepared in any process employed to produce the snackfood of the invention should have a moisture content no lower than about 7% by weight. Preferably, however, the moisture content should be from about 10% to about 30% by weight, typically about 11% by weight.

In the processes of the invention, frying may be accomplished in hot fat or oil, typically hot cooking oil, within the usual temperature range of from about 160° C. to about 215° C. In that respect, it is a particular advantage of the dough used in the present invention that it can be cooked at temperatures below the upper end of the range, e.g. at about 190° to about 195° C. (typically about 193° C.). This is advantageous in that the oil will be further from its boiling point and will tend to smoke less.

Alternatively, "half products", preferably of from about 10 to about 15% moisture content by weight, can be cooked by heating the "half product" by immersion in a bed of hot particulate material such as salt or calcium carbonate, and separating excess particulate material from the expanded cooked product. The cooked product can then be sprayed or otherwise treated to incorporate the necessary amount of oil or fat, which affords the desired flavour.

A variety of additives may be included in the snackfood of the present invention to provide the required visual and/or organoleptic properties. Such additives may be included either in the dough, especially in the case where a pre-gelatinized starch is employed, or by spraying onto the cooked food. Thus, the palatability of the snackfood can be improved by adding flavouring agents, amongst the preferred being salt and vinegar, cheese and/or onion, bacon, meat, fist, tomato, chicken and ham. Such flavouring agents are commercially available and may comprise hydrolysed vegetable protein, monosodium glutamate, common salt, spices, synthetic flavours and/or natural flavours, as well as sugar and/or one or more artificial sweeteners, for example, aspartame, to give the required flavour and aroma. Typically up to about 30% by weight of flavouring agent may be incorporated in the dry mixture from which the dough may be prepared by adding water, and the preferred level is about 10% by weight or lower, for example, 4% by weight.

Currently, Health Authorities are tending towards a policy of wishing to limit salt in dietary products and the like. Accordingly, if desired a snackfood according to the invention for use in conjunction with a low-salt or salt-free dietary regime may have a "salty" taste provided by the inclusion of potassium and/or ammonium chloride in approximately the same amount by weight as (and as a whole or partial substitute for) sodium chloride.

In addition, the snackfood may be supplemented by including a proteinaceous supplement and typically up to about 75% by weight or proteinaceous material may be incorporated in the dry mixture from which the dough is prepared. Typically such proteinaceous materials may be milk proteins, especially caseinates, soya, wheat and corn gluten. The inclusion of proteinaceous material improves the nutritional value of the snackfood.

To achieve the necessary level of bran in the final product, up to about 75% by weight of bran may be included in the dry mixture from which the dough is prepared. However, the especially preferred range for palatability is from about 30 to about 40% by weight of bran in the mixture.

As mentioned above, the expanded snackfood of the present invention can contain less fat or oil than similar known snackfoods. In particular, typical snackfoods in accordance with the present invention will contain no more than about 35%, preferably no more than about 30%, more preferably no more than about 25%, and still more preferably no more than about 20% by weight of fat or oil, e.g. about 8 to about 20% by weight fat or oil. Typically also, the moisture content of the final product may be between about 2.5 and about 3% by weight.

The following Table II gives typical bran, fat and moisture contents for snackfoods in accordance with the present invention compared with a snackfood containing no bran.

TABLE II

Composition of wheat/bran crisp with different contents of bran

| Bran Content of Dry Mix | Composition of Crisp $^a$(% by weight) | | | | | | |
|---|---|---|---|---|---|---|---|
| | Bran | Fat | Flavour | Wheat Flour | Moisture | Protein | Dietary Fibre | Energy Value Kcal/100 g |
| 0 | 0 | 40 | 5.5 | 48.5 | 2.5 | 4.8 | 1.5 | 523 |
| 10 | 7 | 30 | 6.5 | 51.5 | 2.5 | 6.0 | 4.5 | 467 |
| 20 | 15 | 24 | 7.1 | 46.9 | 2.5 | 6.8 | 8.1 | 405 |
| 30 | 24 | 20 | 7.5 | 43.5 | 2.5 | 7.6 | 12.0 | 375 |
| 40 | 35 | 13 | 8.2 | 38.8 | 2.5 | 8.8 | 17.0 | 320 |
| 50 | 45 | 9 | 8.6 | 32.4 | 2.5 | 9.5 | 21.0 | 285 |

$^a$Assumes Wheat Flour contains 10% by weight protein and 3% by weight fibre
Bran contains 14% by weight protein and 44% by weight fibre

DESCRIPTION OF THE PREFERRED EMBODIMENTS

The following Examples (including a first comparative Example) illustrate the preparation of expanded snackfoods according to the present invention. All of the expanded snackfoods described have an oil or fat content of at least about 5% by weight and are expanded to at least about 1.25 times the volume of the original dough portions. Also, in each case the bran used is a middlings bran having an analysis is set out in Table I above.

EXAMPLE 1

In order to compare the results obtained with raw and treated bran, a dough composition was prepared from the following ingredients, using three different types of bran:
Water: 700 mls
Potato starch: 580 g
Bran: 600 g
Potato flour: 40 g
Palm oil: 14 g
Salt: 40 g Doughs having the above composition were prepared by first mixing the starch only with the water. The mixing was effected at about 90° C. in a mixing bowl immersed in a container of water at about 90° C., thereby forming a hot water jacket to minimise heat loss during mixing, for a period of about 5 minutes, which permitted the starch visibly to gel. The other ingredients were then added and the whole mixed for a further 15 minutes in a Hobart mixer. Finally, the mix was extruded through a plate with three-eighths of an inch diameter holes.

The dough compositions produced and extruded were as follows:
Composition A in which the bran was raw bran having a maltose value of about 550 mg/10 g;
Composition B in which the bran was a partially-heated commercially-available product having a moltose value of about 186 mg/10 g and a moisture content of about 12.4% by weight; and
Composition C in which the bran was a specially heat-treated bran autoclaved at about 120° C. and under about 15 psi of pressure for about 20 minutes,
and having a maltose value of about 90 mg/10 g and a moisture content of about 10.3% by weight.

Composition A produced with the raw bran was very sticky. Moreover, it proved impossible to extrude properly and there were visible signs of starch liquefaction. On the other hand Composition B produced with partially-heated bran extruded satisfactorily and was not sticky, although the strand elasticity was only fair and the strands broke rather easily.

However, with Composition C produced using the fully heat-treated bran, a much better extruded material was obtained, of good gel strength and elasticity, with strands of about 1 meter in length and capable of holding their own weight without breaking.

In addition, two further dough mixes were produced as described above, one mix being produced using the bran used for composition B and the other mix being produced using the same bran but after it had been autoclaved at about 120° C. and about 15 psi for about 20 minutes. Each mix was divided into two portions, one portion being placed in a polythene bag and the other portion being extruded as before. The samples from each of the two mixes that had been placed in polythene bags were incubated for about two hours at about 40° C., after which those too were extruded as before.

A comparison of the extruded material after incubation with the material extruded without delay showed there was little difference in the fully-heated bran mix, but a significant difference in the partially-heated bran mix, as exhibited by a marked lowering of the strength and elasticity of the extruded strands with time.

In each case, the half-product produced on extrusion using unincubated Composition B or Composition C whether incubated or not could be cooked to produce a suitable snackfood in accordance with the invention, for example, by frying in hot vegetable fat at about 193° C. for about 10 seconds.

Furthermore, two other dough mixes were produced as described above, this time with brans of maltose value 350 mg/10 g and 450 mg/10 g respectively. On incubation for various time periods, the results given in Table III below were obtained:

TABLE III

| Incubation time at 40° C. | Dough including bran of maltose value 350 mg/10 g | Dough including bran of maltose value 450 mg/10 g |
|---|---|---|
| Nil | Extruded evenly and cleanly - dough strength and elasticity only fair | Extruded evenly and cleanly - dough strength and elasticity poor |
| 30 minutes | Sticky giving uneven extrusion - dough of poor | Extruded poorly - dough of very poor strength and |

TABLE III-continued

| Incubation time at 40° C. | Dough including bran of maltose value 350 mg/10 g | Dough including bran of maltose value 450 mg/10 g |
|---|---|---|
| | strength and elasticity - strands adhered to one another and were of sticky texture | elasticity and very sticky |
| 1 hour | Extruded with difficulty - strands very sticky and of insufficient strength or elasticity not to break | Very difficult to extrude - strands very sticky with no strength or elasticity - broke up and adhered to one another |
| 2 hours | Very difficult to extrude - strands inseparable and very sticky with no strength | Would not extrude - consistency resembling porridge |

It is to be noted here that all of the maltose values referred to herein and in the claims are measured by the method of Blish and Sandstedt (1933)—see, for example, "Modern Cereal Chemistry" (1967)—Kent, Jones and Amos—and "Pearsons Chemical Analysis of Foods", 1981. Since there are other methods which employ different principles and units e.g. those of Rumsey (pre 1933) and Hildebrand and McClellan (1938), it is important to note the method and units employed in the present invention.

In the next following Examples, various preparative processes are illustrated using either a mix containing pre-heated bran and gelatinized starch, or a mix initially containing raw bran and ungelatinized starch, together with a process step in which both the bran and starch are heated to reduce amylolytic activity of the former and at least partially to gelatinize the latter.

(A) EXAMPLES OF DRY COLLET PROCESSES

EXAMPLE 2

A mix was made of the following ingredients:
Gelatinized wheat flour: 60 g
Flavouring: 10 g
Wheat bran (pre-heated): 30 g
To 100 g of this mix were added 80 ml of water and the whole mixed well into a dough. The dough was formed into a cylindrical rod of 25 mm diameter and cut into thin slices 1 mm thick. The latter were dried in a warm room overnight. The dried slices were then cooked in hot vegetable fat at 193° C. for about ten seconds.

EXAMPLE 3

A mix is made of the following ingredients:
Gelatinized wheat flour: 60 g
Flavouring: 10 g
Wheat bran (pre-heated): 20 g
Soya protein isolate: 10 g
A snackfood is prepared from this mix as described in Example 2.

EXAMPLE 4

Potato flour is produced by washing and peeling raw potatoes, then boiling and mashing them after straining and rejecting the water. The mashed potato is rolled dry over hot rollers as a powder of moisture content about 4 to about 5%. Wheat starch in fine powder form and wheat bran are mixed with the potato flour in the following proportions:
Potato flour: 20 g
Wheat starch: 40 g
Bran (unheated i.e. raw): 30 g
Sufficient water is added to make a dough (80 ml). The dough is extruded into a cylindrical rod, cut into lengths of about 30 cm, placed in boiling water and allowed to boil for 45 minutes at least partially to gelatinize starch and to reduce the amylolytic activity of the bran. The gelatinized product is cut with a sharpknife into thin wafers, which are then dried in a warm room overnight. The slices are fried in oil at 193° C.

EXAMPLE 5

The following ingredients are intimately mixed according to the formula below:
Potato granules (gelatinized): 30 g
Potato starch (non-gelatinized): 30 g
Pre-gelatinized potato starch: 7 g
Wheat bran (pre-heated): 30 g
Salt: 3 g The ingredients are mixed for 8 minutes in a vertical mixer and the moisture content adjusted to about 35% by weight by addition of water. After mixing, the material is extruded through a standard pasta press at a temperature of from 55° to 65° C. and at a pressure of from 90 to 110 Kg/cm$^2$. The die produced spiral shaped pieces approximately 30 mm in length and 1 cm in diameter, with a wall thickness of 1 mm. After extrusion, the pellets are slowly dried in a drum drier at a temperature of from 35° to 55° C. for about 6 hours. The final moisture content of the "half product" is about 11% by weight. The "half product" is fried in oil at 205° C. for about 15 seconds.

EXAMPLE 6

The following ingredients are mixed at 55° C. for 20 minutes into a slurry:
Potato flour: 20 g
Wheat bran (unheated): 20 g
Flavouring: 5 g
Water: 55 g
The slurry is extruded onto a roller dryer operated at 100° C. to gelatinize starch and to reduce the amylolytic activity of the bran. The drums are allowed to rotate for 1 minute until a film of approximately 0.5 mm thickness has built up. The multi-layer film is removed as a sheet with a blade and cut into 2.5 cm×4 cm rectangles and dried to about 11% by weight moisture. These are deep fried for 10 seconds in fat at 170° C.

In the above Example the potato flour can be replaced by pea or wheat flour.

EXAMPLE 7

The above Examples are repeated except that the dried "half product" is cooked by immersion in hot particulate salt instead of by frying to produce a cooked, but fat-free product. For each repeat Example, a snackfood having an oil content of a magnitude which give a palatable product is produced from the cooked product by spraying with a vegetable oil. In this way there are produced five batches of snackfood having respectively an oil content of 35%, 30%, 25% and 15% by weight.

(B) EXAMPLES OF FRYING WET COMPLETELY GELATINIZED DOUGH

EXAMPLE 8

A mix is made as described below of the following ingredients:
- Potato granules (gelatinized): 600 g
- Isolated soya protein: 300 g
- Wheat bran (pre-heated): 300 g
- Salt: 60 g
- Glycerol monostearate: 20 g
- Water: 700 g The water, salt and glycerol monostearate are mechanically blended and the remaining dry ingredients mixed in a Hobart mixer. The wet blended ingredients are then added to the dry mixed ingredients and mixed until the mass is free flowing. The mixture is then extruded in a press using a 1.25 mm by 2.5 mm ribbon die at a temperature of 74° C. The extruded ribbon is stretched by from 30% to 40% and cut into 3 cm lengths and fried at 190° C. for 45 seconds.

EXAMPLE 9

A potato dough is made from the following composition:
- Potato granules (gelatinized): 70 g
- Wheat bran (pre-heated): 27 g
- Guar gum: 1.5 g
- Salt: 1.5 g The above dry ingredients are mixed together and then uniformly mixed with about 226 ml water at 60° C. to form a dough slurry of about 30% by weight solids content. The dough is fed through a piston extruder with a die of 1 cm×1 cm and cut into portions 7.5 cm long. The cut portions are discharged into a deep fat fryer at 170° C. for about 90 seconds. The part-fried material is stored deep frozen until required. To prepare for consumption the frozen portions are toasted in a standard bread toaster for from 1 to 3 minutes.

EXAMPLE 10

The process of Example 9 is repeated, except that raw bran is used instead of heated bran, and the temperature of the dough slurry is kept below 10° C. by refrigeration. The dough is fed through a piston extruder and fried as before.

EXAMPLE 11

The following ingredients are mixed in a Hobart mixer to form a dough:
- Potato flakes (gelatinized): 200 g
- Bran (pre-heated): 100 g
- Hydrolysed soyabean oil*: 5 g
- Ascorbic acid: 1 g
- Water: 200 g

*containing 40% monoglycerides, 40% diglycerides and 20% triglycerides.

The dough at a temperature of 45° C. is passed through a two roll mill to give a sheet 0.4 mm thick which is cut into elliptical pieces of 7.5 cm×5 cm diameter. These are deep fried in cottonseed oil at 175° C.

EXAMPLE 12

A mix is made of 97% by weight of tapioca and 3% by weight of salt. About 700 g of the mix are then cooked with 300 ml of water in a pressure cooker. The cooked dough is extruded through holes 3 mm diameter and cut into pellets 1.5 mm to 3 mm length. The pellets are then mixed with dehydrated mashed potatoes and bran as follows:
- Pellets (32% by weight moisture): 25 g
- Mashed potato (gelatinized): 25 g
- Bran (pre-heated): 25 g
- Water: 18 g The overall moisture content is 32% by weight.

The mixture is finely chopped and blended and the granular material fed through rollers to form a sheet 0.75 mm thick from which elliptical shaped chips are cut. These are fried in coconut oil at 200° C. for 15 to 20 seconds.

(C) Examples of frying a wet dough containing some ungelatinized starch

EXAMPLE 13

The following ingredients are combined in a 5 quart Hobart mixer using a paddle turning at low speed for 1 minute:
- Dried potato flakes (gelatinized): 100 g
- Potato starch (ungelatinized): 100 g
- Wheat bran (pre-heated): 100 g
- Salt: 7 g During an additional one minute, 347 mls of water at room temperature are added and mixing continued for one minute thereafter. The mixture is then placed in a piston extruder. By application of force, the mixture is extruded through a die opening of 2.5 cm by 1 mm dimensions. The extruded dough is cut with a knife into pieces approximately 5 cm long, and as cut the pieces are allowed to fall into a standard fryer containing hydrogenated vegetable oil at 190° C. where they are fried for 90 seconds.

In the above Example, potato starch can be replaced by tapioca starch with excellent results.

I claim:

1. An expanded snackfood prepared from a dough composition of predetermined volume and comprising cooked portions of dough composition comprising gelatinized starch and added, heat-treated cereal bran having amylase therein destroyed, said bran being selected from the group consisting of wheat bran, barley bran, oat bran, rye bran, maize bran and mixtures thereof, the snackfood containing from about 5% to about 35% by weight of oil or fat and from about 15% to about 70% by weight of bran, and having a volume at least about 1.25 times said predetermined volume.

2. A snackfood according to claim 1, containing from about 20% to about 50% by weight of bran.

3. A snackfood according to claim 1 or claim 2, which contains less than about 30% by weight of fat or oil.

4. A snackfood according to claim 3, which contains less than about 20% by weight of fat or oil.

5. A snackfood according to claim 1 or claim 2, wherein the dough portions are expanded to at least about 1.50 times their original volume by cooking.

6. A snackfood according to claim 1 or claim 2. wherein the dough which is cooked contains about 100% by weight of gelatinized starch.

7. An expanded snackfood prepared from a dough composition of predetermined volume and comprising cooked portions of dough composition comprising gelatinized starch, about 15% to about 70% by weight of added cereal bran selected from the group consisting of wheat bran, barley bran, oat bran, rye bran, maize bran and mixtures thereof, and about 5% to about 35% by weigth of oil or fat, and having a volume at least about 1.25 times said predetermined volume, wherein said bran is heated before it is added to said dough composition.

8. In a process for preparing an oil- or fat-containing expanded expanded snackfood in which a dough composition having a predetermined volume and containing gelatinized starch is expanded as it is cooked to a volume at least about 1.25 times said predetermined volume, the improvement comprising including in said dough composition added, heat-treated bran having amylase therein destroyed, said bran being selected from the group consisting of wheat bran, barley bran, oat bran, rye bran, maize bran and mixtues thereof.

9. In a dough composition having a predetermined volume and of the type for use in preparing an expanded snackfood and which contains gelatinized starch in an amount to effect during cooking of the dough composition an expansion thereof of at least about 1.25 times the volume of said predetermined volume, the improvement comprising said dough composition including added bran selected from the group consisting of wheat bran, barley bran, oat bran, rye bran, maize bran and mixtures thereof which has been heat-treated, prior to inclusion in said composition, to destroy amylase therein.

10. A snackfood according to claim 9 including about 15% to about 70% by weight of said bran.

* * * * *